US008511660B2

(12) United States Patent
Cassese

(10) Patent No.: US 8,511,660 B2
(45) Date of Patent: Aug. 20, 2013

(54) ELEVATING MECHANISM FOR JAWS FOR CLAMPING MOULDINGS

(75) Inventor: Alain Cassese, Breau (FR)

(73) Assignee: Societe Cassese, Verneuil l'Etang (FR)

( * ) Notice: Subject to any disclaimer, the term of this patent is extended or adjusted under 35 U.S.C. 154(b) by 652 days.

(21) Appl. No.: 12/304,433

(22) PCT Filed: Jun. 13, 2007

(86) PCT No.: PCT/FR2007/000976
§ 371 (c)(1),
(2), (4) Date: May 5, 2009

(87) PCT Pub. No.: WO2007/144505
PCT Pub. Date: Dec. 21, 2007

(65) Prior Publication Data

US 2010/0025906 A1 Feb. 4, 2010

(30) Foreign Application Priority Data

Jun. 14, 2006 (FR) .................................... 06 05283

(51) Int. Cl.
*B25B 5/14* (2006.01)
*B23Q 3/00* (2006.01)

(52) U.S. Cl.
USPC ................ 269/41; 269/55; 269/305; 269/910

(58) Field of Classification Search
USPC ............. 269/41, 42, 45, 55, 124, 289 R, 305, 269/309, 910; 29/281.1, 281.3, 281.4
See application file for complete search history.

(56) References Cited

U.S. PATENT DOCUMENTS

| | | | | |
|---|---|---|---|---|
| 6,519,825 | B1 * | 2/2003 | Lambert et al. | 269/41 |
| 6,651,861 | B2 * | 11/2003 | Raffoni | 227/120 |
| 6,722,020 | B2 * | 4/2004 | Caldwell | 269/55 |
| 6,860,476 | B2 | 3/2005 | Cassese | |

FOREIGN PATENT DOCUMENTS

| | | | |
|---|---|---|---|
| EP | 1172179 | A2 | 1/2002 |
| FR | 2816868 | A1 | 5/2002 |
| FR | 2836856 | A1 | 9/2003 |

* cited by examiner

*Primary Examiner* — Hadi Shakeri
(74) *Attorney, Agent, or Firm* — Marsh Fischmann & Breyfogle LLP

(57) ABSTRACT

The mechanism for a machine for stapling two moldings (21, 22) comprises a surface (10), for supporting the moldings (21, 22), and a linkage for operating two jaws (6, 7) in a functional plane (25) essentially parallel to the surface (10) in order to push the two respective moldings (21, 22) sideways towards respective functional positions against two respective side stops (2, 3) that extend in mutually inclined directions, and in order thereafter following the stapling, to draw back from the stops (2, 3) and return to a rest position; the linkage comprising elevating elements designed to move the jaws (6, 7), under the action of drive elements (50, 51), in a direction (70) perpendicular to the functional plane (25), so that the jaws (6, 7) are thus retracted, in the rest position, out of the functional plane (25).

14 Claims, 9 Drawing Sheets

ELEVATING MECHANISM FOR JAWS FOR CLAMPING MOULDINGS

BACKGROUND OF THE INVENTION

The present invention relates to a control mechanism for a pair of jaws for clamping mouldings intended to be stapled together to finally constitute a frame.

A standard stapling machine comprises a work table (see FIG. 1) intended to receive the under surfaces of two mouldings to be stapled, positioned by an operator, and two roughened jaws, with grips, then push the front face of each moulding, i.e. the inside face of the future frame, so as to bring the opposite rear face against one of two respective framing work rest strips forming side stops of the table, mutually perpendicular and delimiting a stapling corner. The two mouldings are thus brought and held according to the desired right-angle orientation, with their ends abutted against each other in this corner. Each jaw thus constitutes a holding jaw by clamping a moulding, cooperating with the associated stop. Thus, the staple will actually penetrate at the desired location in each end section, i.e. will be anchored in the bulk of each moulding.

Once the positioning of the two mouldings has been carried out in this way, a press head, situated above the stapling corner, descends to rest against the front longitudinal edge of the end sections of the two mouldings, in order to act as an upper counter-support to an upturned stapling head situated flush with the surface of the table to insert the staple in the under surface.

Then, the jaws move away from the side stops to release the assembled pair of mouldings, and the operator can then lift them to a level above the jaws to turn the assembly a quarter-turn parallel to the table, in order to place one of the two end sections of this pair which remain free, in position in the stapling corner and staple a third moulding, recommencing these operations once again for a fourth moulding which completes the frame.

Such a machine does indeed allow stapling to be performed correctly, but the manoeuvre that the operator must perform to ensure each time that the previously-assembled mouldings are then presented according to an orientation offset by a quarter-turn, is relatively long and arduous.

In fact, as soon as at least two large-dimension mouldings have been joined, they delimit on the table, with the third, even the fourth moulding, a large obstructive area of the future frame, thus constituting a sort of guardrail which prevents the operator from standing next to the table. The operator is thus working in an awkward position when he lifts the assembled mouldings to disengage them from the jaws, which is not ergonomic.

Another drawback is linked to the fact that the press head overhanging the corner constitutes an obstruction when the operator disengages the stapled mouldings, as this disengagement is carried out by lifting. Therefore at rest, the press head must present a relatively large stand-off distance, but since this stand-off distance is also the distance of travel of the head, the rate of operation is limited accordingly, due to the fact that the speed of travel must remain limited in order to avoid an excessive impact which would risk damaging the mouldings.

BRIEF SUMMARY OF THE INVENTION

The present invention aims to propose a solution to these problems.

To this end, the invention relates to a mechanism for a machine for stapling two mouldings, comprising a table for supporting the mouldings, and a kinematic linkage for actuating two jaws in a operating plane substantially parallel to the table, for pushing the two respective mouldings sideways towards a respective functional position, against respectively two side stops extending in mutually inclined directions, and then after stapling, for moving away from the stops and returning to a rest position, characterized by the fact that the kinematic linkage comprises elevating means arranged for displacing the jaws under the action of drive means in a direction transverse to the functional plane, so that the jaws are thus retracted into the rest position, outside the functional plane.

Thus, after stapling, the table becomes free of any obstacle once again, so that the operator can slide the assembled mouldings towards him without needing to lift them, in order to then turn them through 90 degrees by sliding on the table, in order to proceed with a new stapling. In other words, the operator only requires two-dimensional freedom of movement of the frame being produced, i.e. a displacement on the table, without the need to have room to manoeuvre upwards.

It will be noted that although the retraction of the jaws is advantageously carried out downwards, i.e. into a well provided in the table or to the side, this retraction can also be provided upwards.

The term “elevating” can therefore equally well denote an element which rises to bring the jaws into their operating plane and which will then redescend after stapling, or an element which firstly descends then rises again.

In an advantageous embodiment, the elevating means comprise a chassis integral with the table and a control unit slidably mounted with respect to the chassis under the action of drive means, in a predetermined direction of sliding with respect to the table, the control unit comprising a detector of the sliding movement which is provided to drive a elevating screw in rotation, the elevating screw being carried by the control unit and oriented substantially perpendicularly to the plane of the table, the screw thread of which is coupled to a rotationally fixed nut integral with a elevating table bearing the two jaws.

This is therefore a load elevator mechanism with a driving screw which is itself driven in rotation by the movement detector. The latter can be controlled directly by the drive means or even indirectly controlled by the drive means via the control unit that they displace.

BRIEF DESCRIPTION OF THE DRAWINGS

The invention will be better understood from the following description of three embodiments of the latter, with reference to the attached drawings, in which.

DETAILED DESCRIPTION OF THE INVENTION

Figure 1:
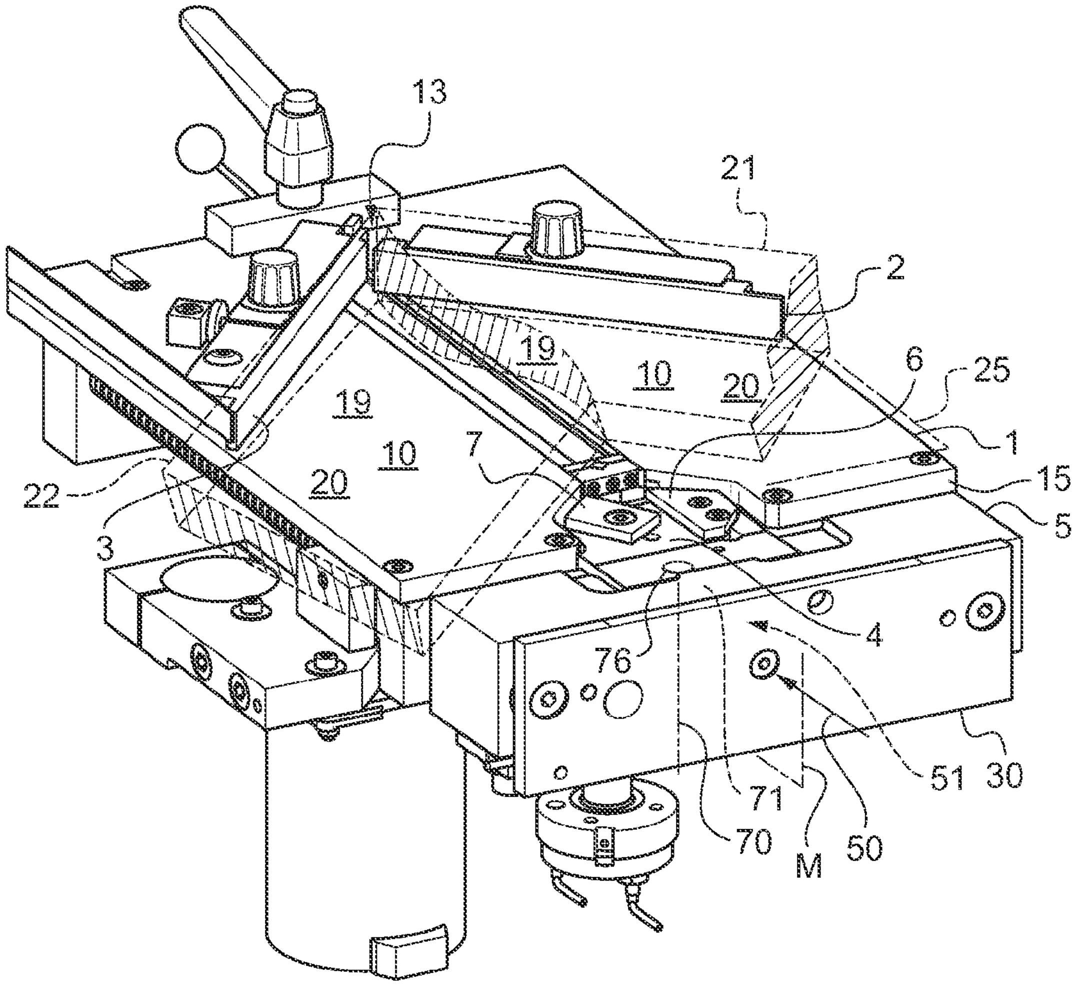
FIG. 1 is a perspective view of a machine for stapling mouldings to produce a frame, implementing the first, second or third embodiment of the invention.
Figure 2:
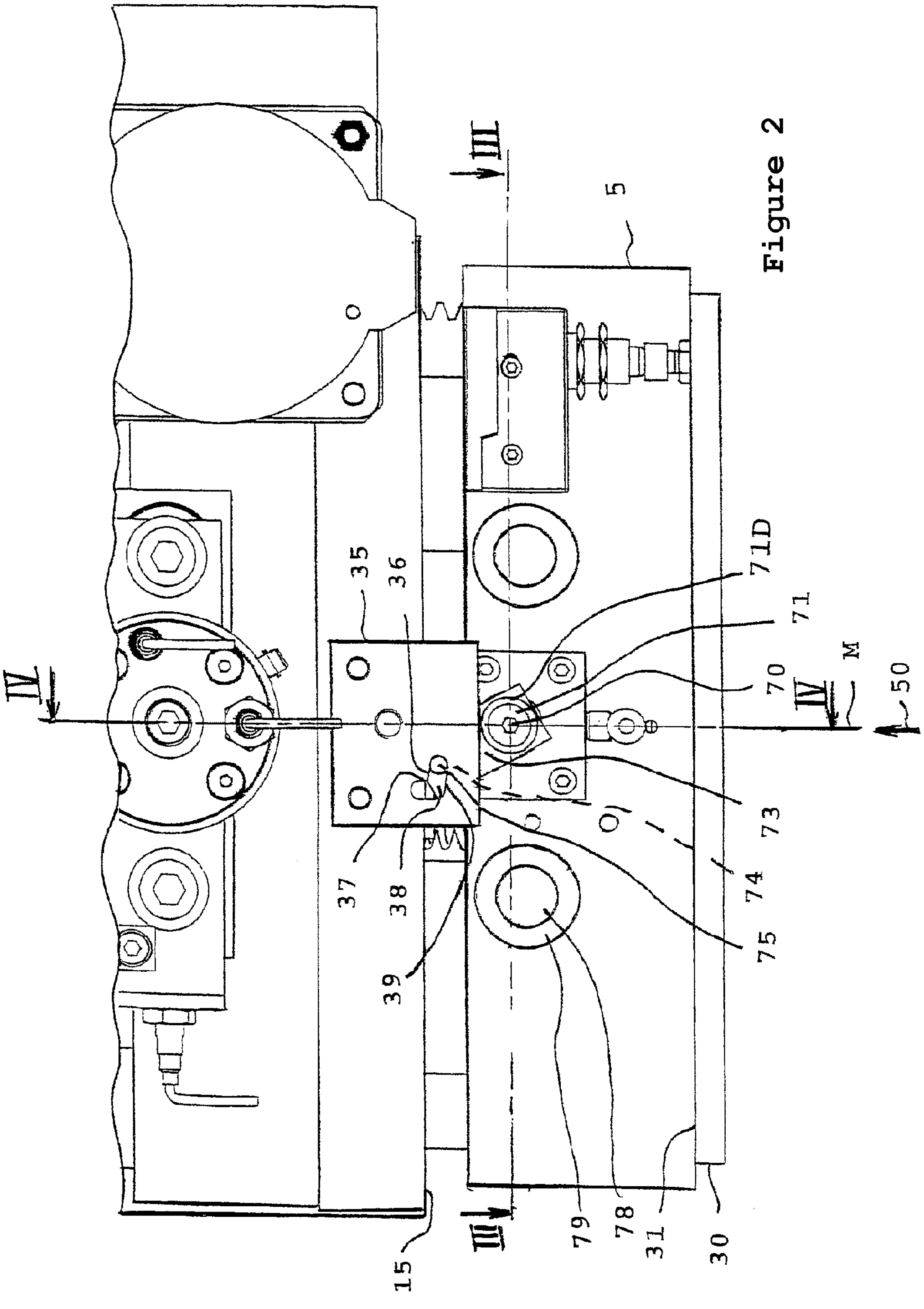
FIG. 2 is a bottom view of such a machine, represented in FIG. 1, according to the first embodiment.

The machine for stapling mouldings according to the first embodiment, represented in FIGS. 1 to 4, is a stapling table, formed by a chassis 1 comprising a fixed table 10 having an upper surface 19 extending in a substantially horizontal plane 20 and intended to receive the rear faces of end sections of two respective mouldings 21, 22, represented very diagrammatically (FIG. 1) by dotted lines and assumed to be transparent. To this end, the table 10 is limited to the rear by two elongated side stops constituted here by two lateral work rest strips 2, 3 projecting with respect to the plane 20 and extending along two perpendicular mutually inclined directions in the usual case of a rectangular frame to be produced. The lateral work rest strips 2, 3 are intended to act as a stop for a rear side of the respective mouldings 21, 22, i.e. an external side of the future frame, in order to position the mouldings 21, 22 in the desired relative orientation, at a right-angle. To this end, a load elevator table 4, or elevator, is provided, which is also mobile horizontally under the effect of the displacement of a control bar 5 which carries it, the mobile table 4 bearing the jaws, here in the form of grippers, respectively right 6, and left 7. The grippers 6, 7 are thus globally mobile in a operating plane 25 (angle in dotted line on FIG. 1) substantially parallel with the plane 20, i.e. horizontal, and from a front zone opposite to the table 10, they come to apply against front faces of the respective mouldings 21, 22, i.e. an inside side of the future frame, so that in this way their rear face is pressed against the framing lateral work rest strips 2, 3. It will be understood that the operating plane 25 is in reality a section of horizontal space since, clearly, the grippers 6, 7 present a certain vertical working surface which will be applied to the front face of the mouldings 21, 22, this surface therefore having a certain height, defining this section.

The position of the work rest strips 2, 3 can here be adjusted according to need. The directions of elongation of the work rest strips 2, 3 intersect at a corner 13, situated in a rear zone of the table 10, against which the points of the end sections of the mouldings 21, 22, bevelled at 45 degrees to define their joint plane, must abut. The stapling is carried out, at the under face of the mouldings 21, 22, by an upturned fixed stapling head, the top of which is situated flush with the plane 20. An operator has previously placed the mouldings 21, 22 substantially abutting against the corner 13, and the machine itself provides a final accurate positioning by means of the respective grippers 6, 7 which are positioned at an angle of 45 degrees alongside the front faces and grip them in order thus to push the mouldings 21, 22 into the corner 13. Then, a press head, situated above the corner 13 and not shown, descends to act as an upper counter-support, in order to avoid a temporary lifting of the mouldings 21, 22 due to the vertical force of a hammer of the stapling head inserting a staple.

The detail of the corresponding mechanism will now be disclosed. In order to simplify the disclosure, the machine is assumed to be in the operational position i.e. with the table 10 horizontal. Of course, if the machine were orientated differently, the description would still be valid with the present orientation references appropriately transposed.

Figure 3:
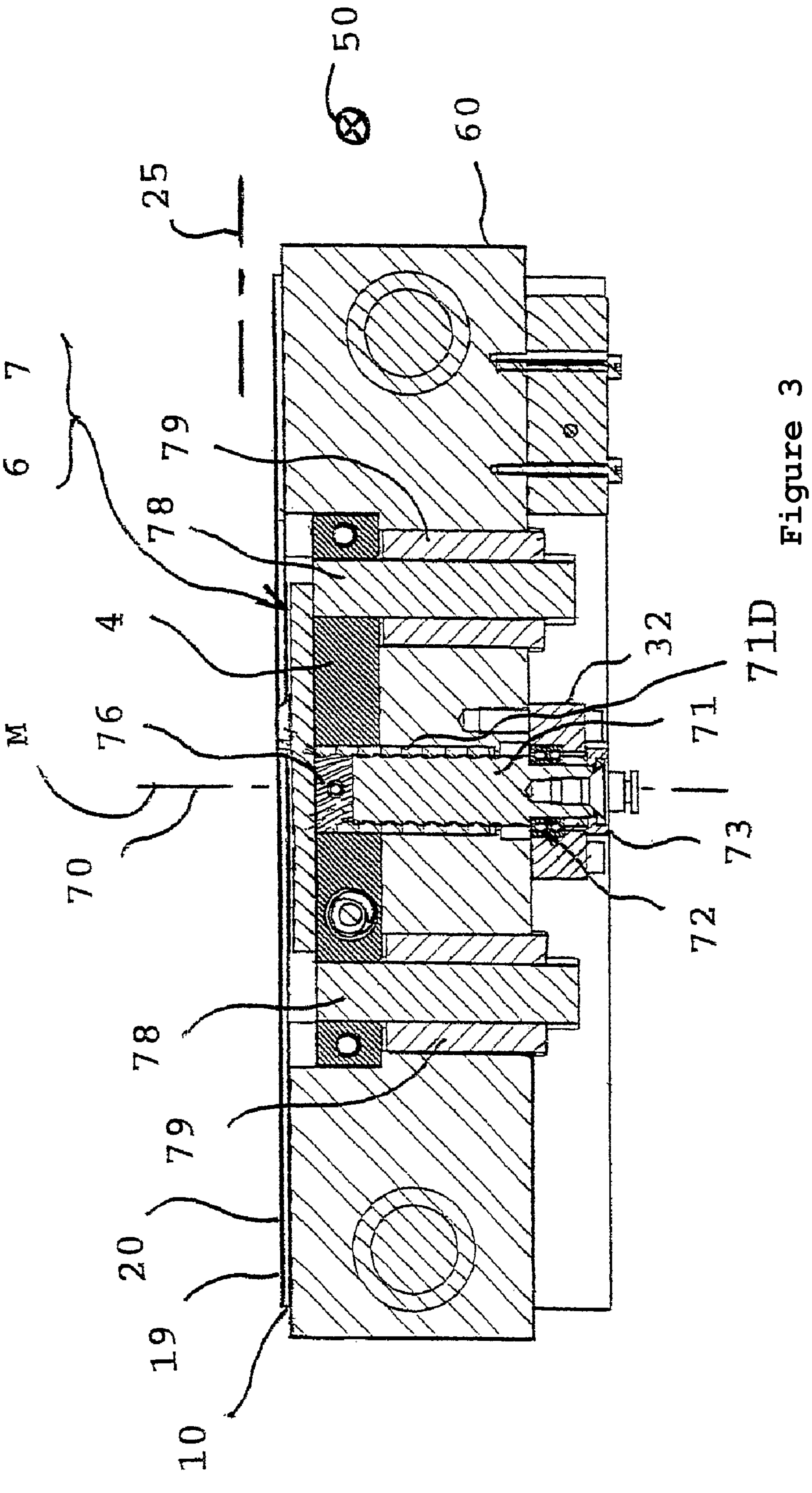
FIG. 3 is a vertical cross-section viewed from the rear of the machine, along the line III-III of FIG. 2, but inverted top to bottom to re-establish the natural orientation.

A vertical front edge 15 of the chassis 1 delimits to the rear a working volume of the mobile unit, here in the form of a bar 5, for controlling the grippers 6, 7, the control bar 5 being mounted slidably horizontally rearwards on two laterally opposed shafts, the ends of which can be seen in cross-section in FIG. 3. The upper sliding is controlled by a cylinder 51 (FIG. 4) which is supported on a vertical front plate 30 limiting the forward working volume, the front plate 30 therefore being fixed, i.e. forming functionally part of the frame 1. The control bar 5 carries a kinematic linkage, two outputs of which control respectively the movement of the grippers 6, 7. The desired movement of the kinematic linkage is caused by the displacement of the control bar 5 in relation to the fixed plate 30, this displacement being detected for this purpose.

The front edge 15 is in fact indented at the mid-point to provide an operation volume for kinematic linkage when sliding towards the rear, in particular its downstream part controlling the grippers 6, 7. In this description, the front edge 15, which does not necessarily operate mechanically, acts as a position reference for explaining the movement of the control bar 5.

Figure 4:
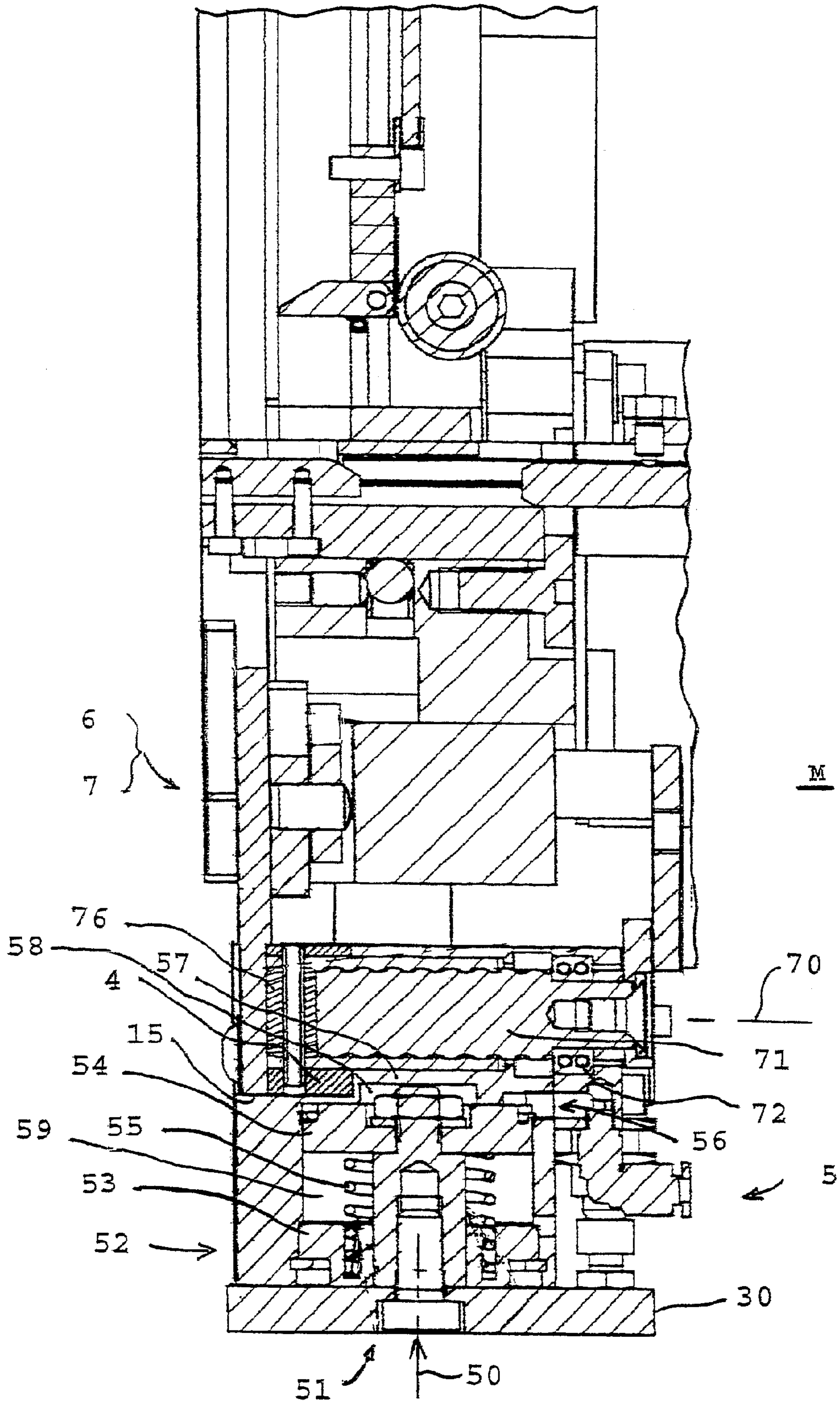
FIG. 4 is a longitudinal side cross-section view of the machine, along the line IV-IV of FIG. 2, but inverted top to bottom to re-establish the natural orientation, FIGS. 5, 6 and 7 illustrating the second embodiment are respectively homologous to FIGS. 2 to 4, FIG. 8, homologous to FIG. 2, is a bottom view of the third embodiment, with the jaws in operational position, FIG. 9, homologous to FIG. 3, is a rear inverted view in relation to FIG. 8, in section along the line IX-IX of FIG. 8, and FIG. 10 and FIG. 11, in section along the line XI-XI of FIG. 10, correspond respectively to FIGS. 8 and 9, but in the rest position.

As shown in FIG. 4, the cylinder 51 has a direction of actuation or geometrical axis 50, here horizontal and perpendicular to the front edge 15, the arrow indicating the direction of actuation, i.e. starting from the rest position. The cylinder 51 comprises a fixed piston 54, mounted integral with the supporting plate 30 and forming with it a fixed chassis, piston 54 on which slides in the direction of actuation 50 a tubular body 52 integral with the control bar 5 in order thus to drive it and associated with a front flange 53, opposite to the piston 54, which comes to abut on the rear face of the support plate 30, turned towards the front edge 15. The flange 53 thus closes a mobile globally cylindrical housing 59, closed at the front by the flange 53 and by a rear radial wall 57, containing the fixed piston 54. In the housing 59, the piston 54, together with the rear wall 57, delimits a compression chamber 58 supplied with fluid under pressure by a passage 56. A compressed spring 55 for returning to the rest position, lodged in the housing 59 but opposite to the chamber 58, therefore between the front flange 53 and the piston 54, opposes the movement of the body 52 during the expansion of the chamber 58.

The body 52 is thus mobile between a rest position, for which the spring 55 holds it abutting in a front position on the support plate 30, and a working position situated at a greater distance from the support plate 30 than it is in the rest position.

As shown in FIGS. 1 and 4, the cylinder 51 in this example is situated at the mid-length of the support plate 30, so that its direction of actuation 50 extends in a vertical mid-plane M of the table 10, the latter being in fact constituted by two identical halves mounted edge to edge (FIG. 1) at the mid-plane M with however a certain offset for access to a staple magazine, which can be seen in FIG. 1. The lateral work rest strips 2, 3 each extend in a direction inclined at 45 degrees to the mid-plane M in a symmetrical manner, so that the corner 13 is situated in the mid-plane M. The action of the cylinder 51 is therefore exerted according to a vector (50, FIG. 1) directed substantially towards the corner 13, and, specifically, passing just underneath.

The kinematic linkage will now be described.

FIG. 3, in a front sectional view, represents an elevating mechanism intended to raise the grippers 6, 7 up to the level of their operating plane 25, from a rest position situated below the level of the upper surface 19 of the table 10. To do this, the cylinder 51 is actuated by the operator using a control (not shown) so that the rear wall 57 of the body 52 of the cylinder 51 is pushed back towards the front edge 15, by the fluid under pressure with respect to the fixed piston 54, and thus similarly for the control bar 5 which is integral with the body 52. Now, the kinematic linkage, carried by the control bar 5, comprises an assembly for deflecting the direction of actuation 50 of the cylinder 51, this assembly comprising a feeler, in contact with fixed chassis 1, which will thus detect the movement of the control bar 5 and which, most importantly, will control the remainder of the elements of this assembly, which are designed to then carry out an upward movement of the grippers 6, 7, i.e. in a transverse direction, here perpendicular, with respect to the horizontal direction of actuation 50, thus a rising perpendicular to the plane 20 of the table 10.

Specifically in this case, the feeler is a rotating connecting rod 73 (FIG. 2) integral, by one end, with a lower end section of a threaded rod or elevating screw 71 (FIG. 3), with threaded teeth 71D having a vertical shaft 70 and rotatably borne on a rolling bearing 72 housed in a supporting block 32 carried by the control bar 5. The elevating screw 71 carries a rotationally fixed nut 76 integral with the load elevator or elevator 4 carrying the grippers 6, 7. The elevator table 4 is integral with two small vertical columns 78, mounted slidable according to the vertical direction of the shaft 70, in two respective guide sleeves 79 fixed to the control bar 5.

The connecting rod 73, here horizontal and therefore having a direction of extension at least partially radial, extends towards the rear from the elevating screw 71 so that a free end 74 of the connecting rod 73 bears obliquely, here by means of a vertical descending pin or stud 75, against a pivoting control slide 36, which is part of a lower horizontal cam plate 35 integral with the chassis 1. The pivoting control slide 36 in this case constitutes one side of an aperture 38 provided in the cam plate 35, in order to facilitate the maintenance of the linkage of the stud 75, in particular during its return travel into the rest position. The stud 75 moreover makes it possible to arrange the cam plate 35 at a low level sufficiently offset so as not to impede the rearward displacement of the control bar 5 and in particular of the elevating screw 71.

The pivoting control slide 36 is turned at least partially forwards, i.e. at least partially facing the travel direction 50 of the displacement in actuation of the body 52, which defines the rearward direction. In order to avoid sticking, the stop bearing contact is oblique, as indicated. To this end, and as the pivoting control slide 36 extends here according to a direction parallel with the front edge 15, i.e. perpendicular to the direction of travel of actuation 50, the pivoting control slide 36 is situated at a distance from the vertical plane, here the mid-plane M, in which the elevating screw 71 carrying the connecting rod 73 is displaced laterally. As a variant, the pivoting control slide could be oriented in an oblique direction, therefore not perpendicular to the direction of actuation 50, and could therefore intersect the vertical plane of the trajectory, towards the rear, of the elevating screw 71.

During the return of the control bar 5, the stud 75 therefore slides over the pivoting control slide 36 and the corresponding pivoting of the connecting rod 73 causes a same rotation of the elevating screw 71, which thus makes the elevating table 4 rise to a height such that the grippers 6, 7 emerge and reach the level of their operating plane 25.

In this example, the pivot angle of the connecting rod 73 is relatively limited, so that, in order to provide the desired travel in vertical translation, the threading of the elevating screw 71 has a very large value pitch, in this case of around ten centimeters, with respect to the diameter of the elevating screw 71. In other words, the threading 71D of the latter has a direction of extension comprising an axial component greater than the radial component. In order to limit the load on the thread flank and therefore the wear, the threading 71D is constituted by a layer of around twenty mutually parallel threads, so that the nut 76 is carried by an adequate total surface.

As a variant, a linkage of toothed wheels can be provided, of decreasing diameters downstream, so that the limited angle of rotation of the connecting rod 73 causes a rotation of the elevating screw 71 according to an increased angle.

As the body 52 has thus travelled over an upstream section of its trajectory, having caused the full emergence of the grippers 6, 7 slightly above the plane 20, and continuing its travel in the same rearward sliding direction 50, it is then necessary to prevent any further upward movement of the elevating table 4, i.e. keeping it at the high level thus reached, while authorizing the continued rearward translation of the control bar 5, so that the grippers 6, 7 come to bear against the front faces of the respective mouldings 21, 22.

For the above prevention, the pivoting control slide 36 extends over a limited range between a resting end of the stud 75, closest to the mid-plane M, and an end-of-travel end, for which the high position of the elevating table 4 is reached. The end-of-travel end is followed, but towards the rear, by another slide 37, to hold the extreme angular position of the connecting rod 73 then reached, i.e. the aperture 38 forms an elbow, here at a right-angle. The holding slide 37 extends towards the rear in parallel to the direction of actuation 50 and is turned in the opposite direction to the mid-plane M of displacement of the elevating screw 71, so that the stud 75 remains at a constant distance from the plane of displacement in rearward translation of the elevating screw 71. The latter therefore retains its angular position during the travel of the downstream section of the trajectory of the body 52 of the cylinder 51, so that any vertical movement of the elevating table 4 is thus prevented.

It can however be provided that at least one downstream section of the holding slide 37 extends towards the rear in a direction slightly set back towards the (mid) plane of translation of the elevating screw 71. In such circumstances, the initial rise of the latter is envisaged to rise slightly beyond the level of the operating plane 25, and the grippers 6, 7 will thus be able to then come alongside the mouldings 21, 22 according to a predetermined angle of descent, which encourages the placing of the mouldings 21, 22 against the upper surface 19 of the table 10.

The grippers 6, 7 thus press and grip the mouldings 21, 22 against the lateral work rest strips 2, 3, the left gripper 7 being moreover here designed to pivot clockwise in FIG. 1, in order to carry out a sweeping of the left moulding 22 in the direction of the corner 13. The pivoting of the left gripper 7 is controlled by a feeler which detects the arrival of the gripper bearing against the left moulding 22, the corresponding feeler mechanism, not shown, can for example be formed according to the principle disclosed for the connecting rod 73.

The above return movement of the kinematic linkage is carried out in reverse according to the indicated trajectory of the various elements, under the effect of the return spring 55, the stud 75 remaining captive in the aperture 38 delimiting the slides 36 and 37 and returning finally to slide back against a front counter-slide 39 of the aperture 38, opposite the slide, on a rear edge, of the pivoting control 36.

Figure 5:
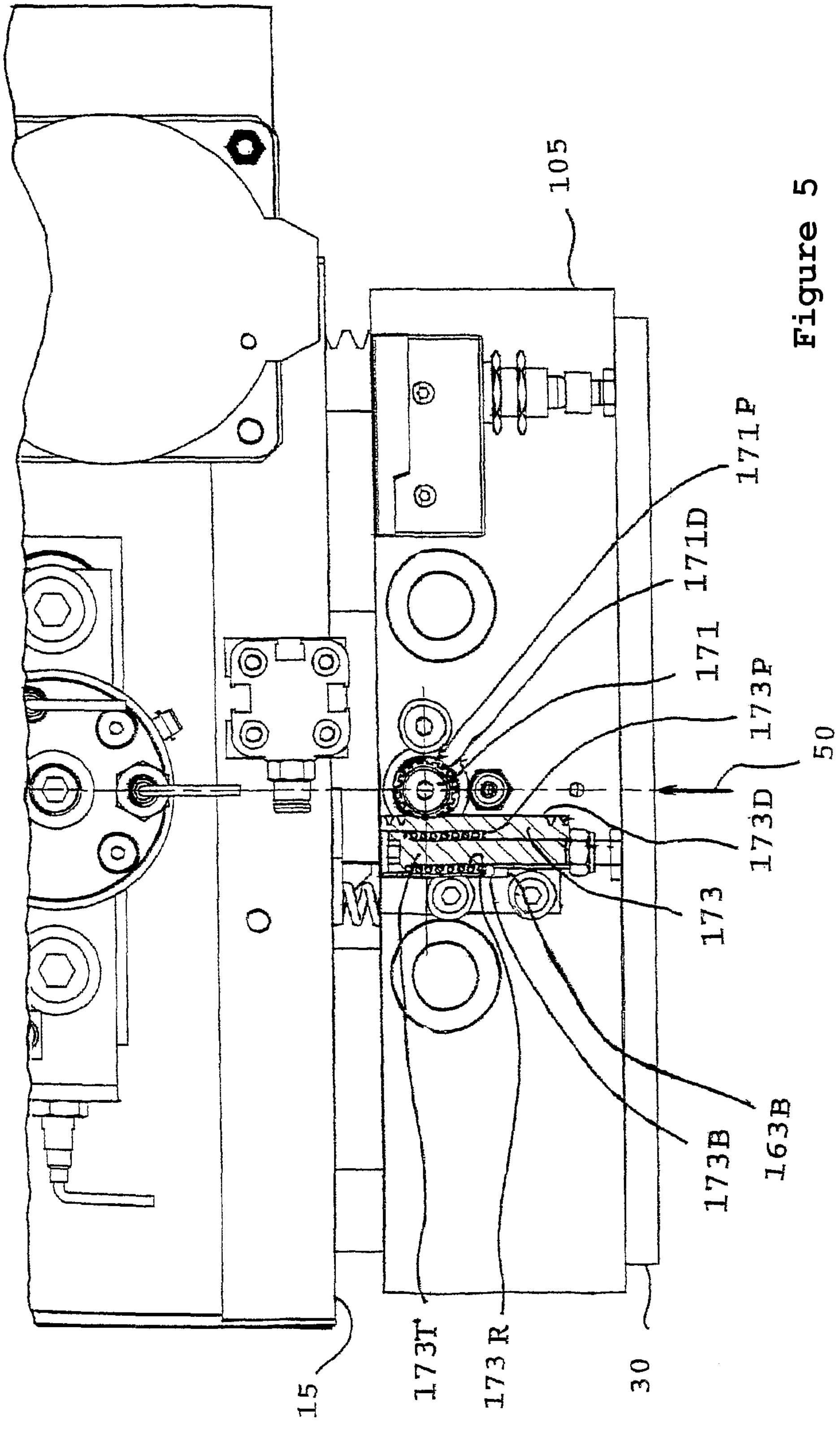
Figure 6:
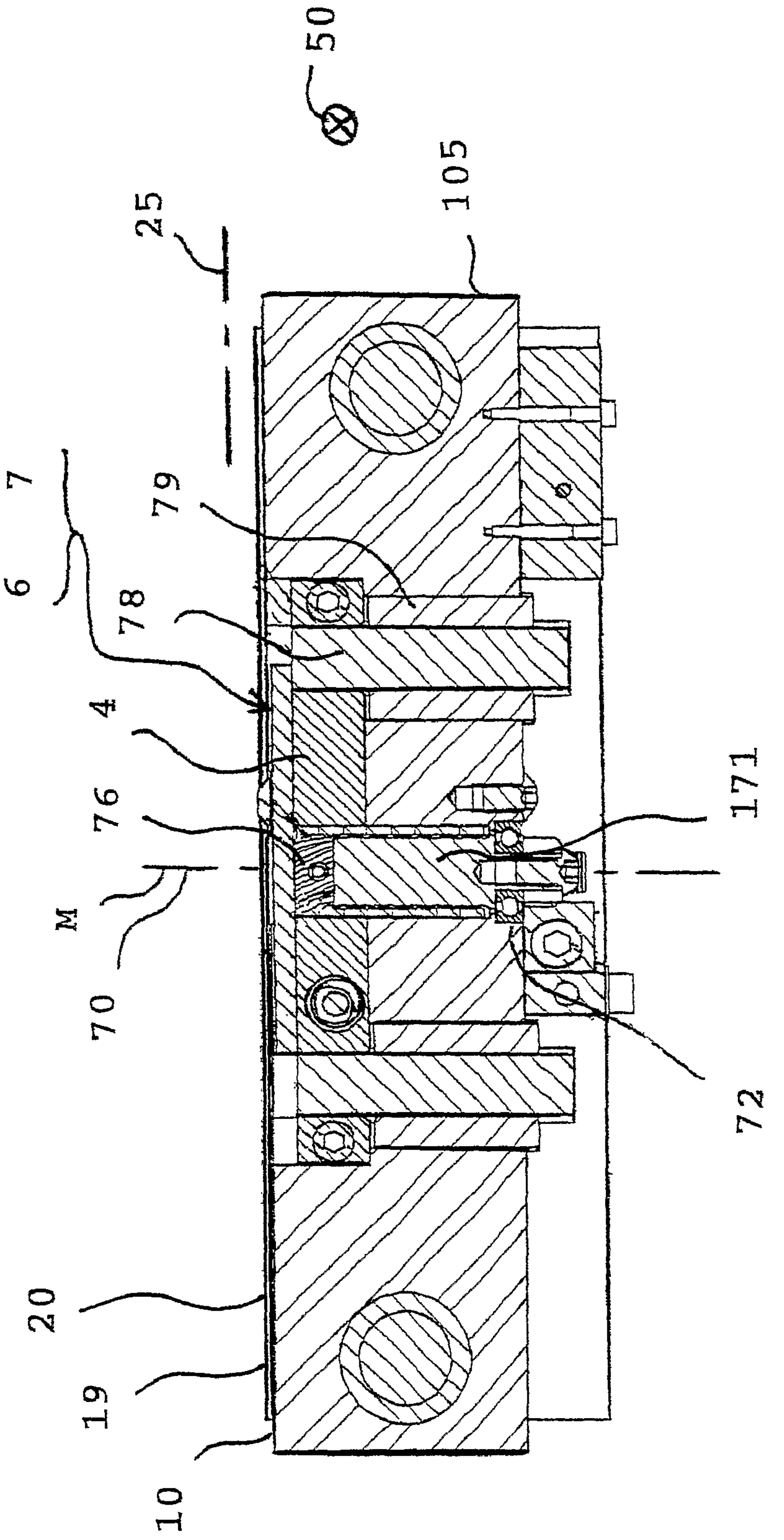
Figure 7:
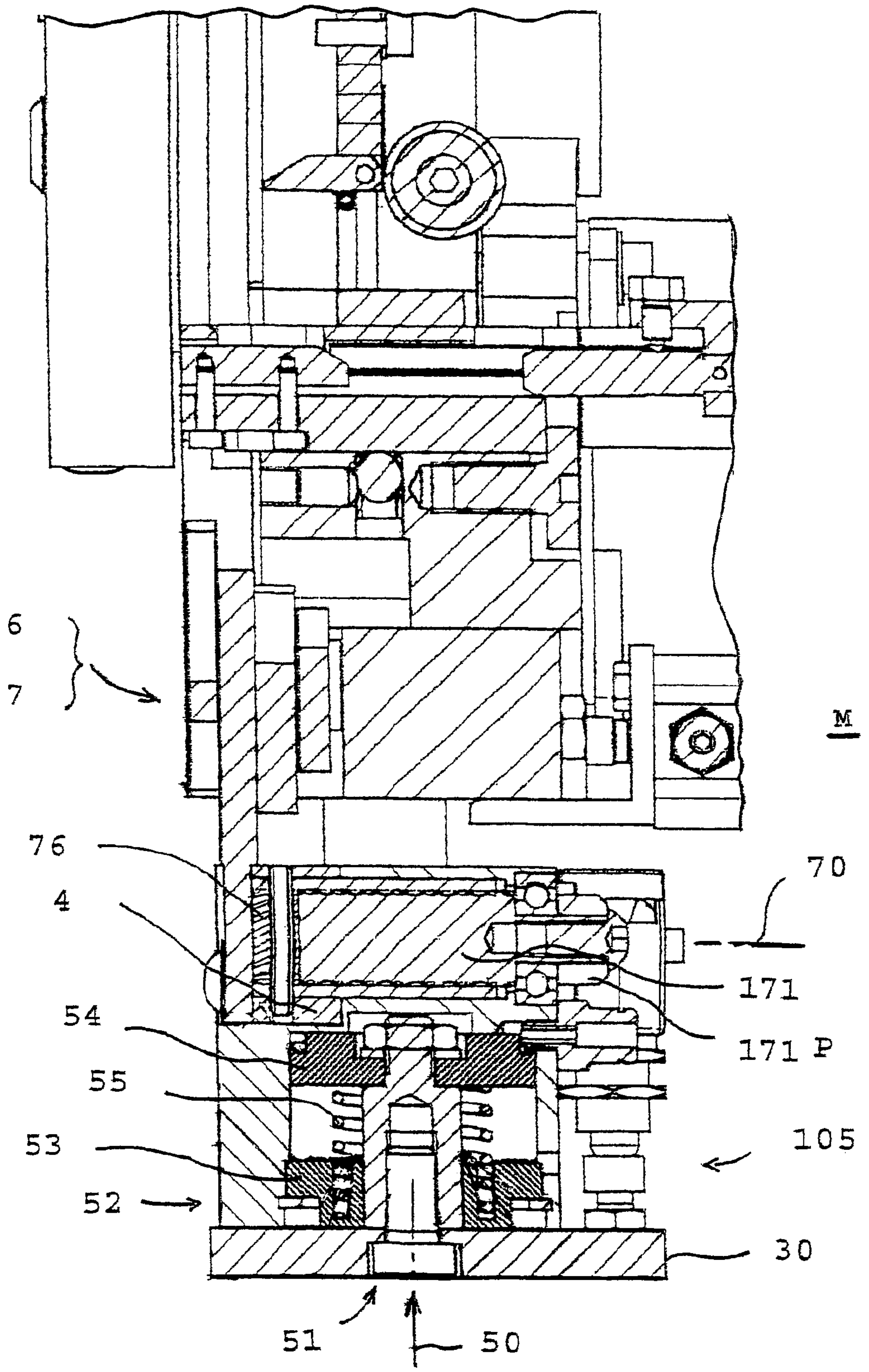

FIGS. 5 to 7 represent the stapling machine according to the second embodiment. The elements identical to those of the first embodiment have retained their reference, while the elements which are simply homologous, i.e. with the same function but with different form, have the same reference but preceded by the one hundred digit "1".

For the sake of brevity of the disclosure, only differences of construction and detailed operation will be given.

The essential difference resides in the fact that the feeler connecting rod 73 is replaced by a rack unit 173, having rack teeth 173D, slidably mounted on a guide rod 173T carried by the fixed plate 30 and extending towards the rear parallel to the shaft 50 of the direction of operation of the body 52. The rack teeth 173D engage with a section, here of the lower end, of the elevating screw 171, forming a pinion 17IP. A calibrated helical spring 173R, housed between the guide rod 173T and a smooth internal guide face of the rack unit 173, bears, by a rear end, on the chassis 1, for example on the fixed front edge 15, to exert a forward return force on a rear shoulder 173P of the rack unit 173. Thus, during the course of the upstream section of travel of the body 52, the spring 173R holds the rack unit 173 in a fixed position with respect to the chassis 1.

Thus when the cylinder 51 translates towards the rear (arrow 50) the control bar 105 with the elevating screw 171, the pinion 171P rolls on the rack 173D remaining fixed with respect to the chassis 1, and the corresponding rotation of a threaded teeth 171D of the elevating screw 171 raises the nut 76 with the elevating table 4, as in the first embodiment.

The prevention of any excessive rise, i.e. beyond the operating plane 25, which was ensured by the holding slide 37, is in this case performed by a pushing stop 163B, integral with the control bar 105 and turned towards the rear, which comes to abut on a driving front stop surface 173B of the rack unit 173 and thus drives it towards the rear, while compressing the spring of the rack 173R, the retardant effect of which on the displacement of the rack unit 173 is thus prevented during the downstream travel of the body 52. The initial travel free of the pushing stop 163B therefore represents the length of the section of upstream travel. The rack unit 173, which has become fixed on the control bar 105, is then driven towards the rear at the same speed as the pinion 171P, so that the disappearance of the relative movement between the latter leads to the fact that the elevating screw 171 maintains its angular position and the elevating table 4 thus remains at the desired height.

As a variant, the rack spring 173R is omitted and the rack unit 173 is integral with the control bar 105 but the rack teeth 173D has a limited length corresponding to the upstream section of the inward trajectory of the grippers 6, 7 in operating position, so that disengagement takes place at the end of this upstream section. A braking device, for example a friction buffer, can be provided to prevent any unwanted rotation of the elevating screw 171 during the course of the downward section of this trajectory.

Figure 8:
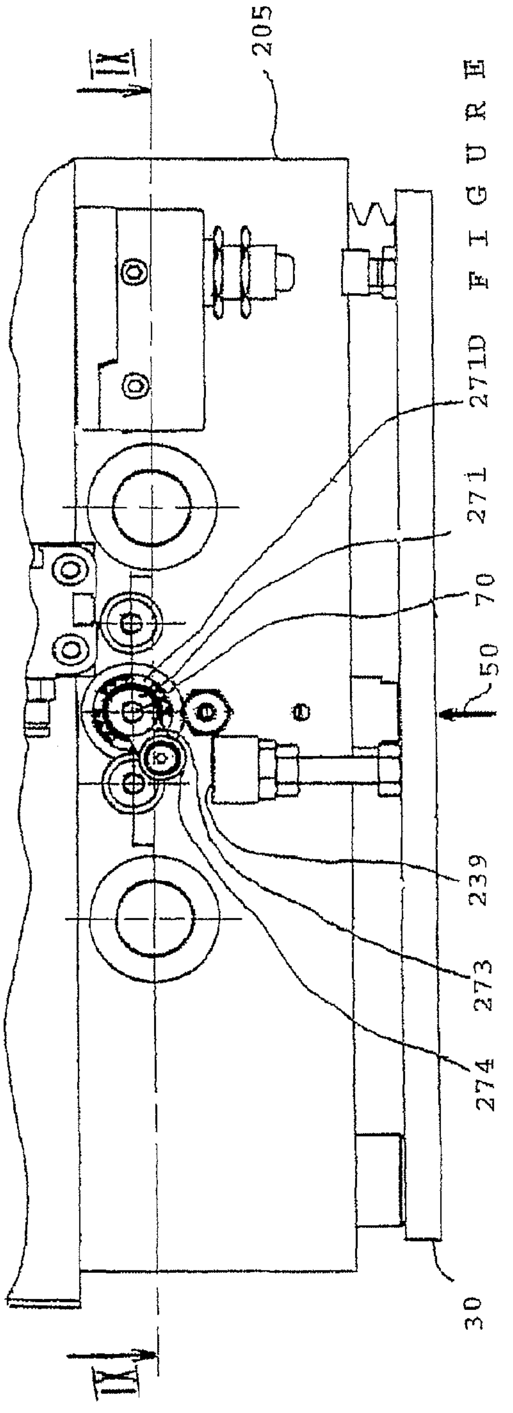
Figure 9:
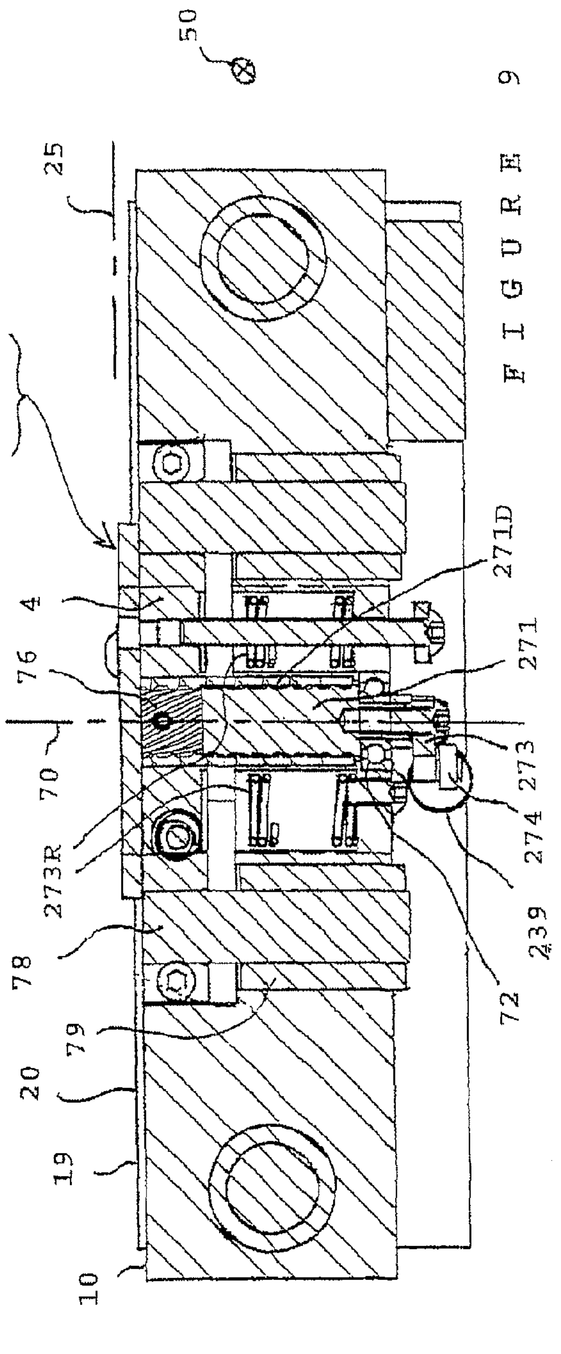

The third embodiment, represented in FIGS. 8 and 9 in the position of clamping of the mouldings 21, 22, uses the principle of the first embodiment, i.e. with a lever arm of which one end, during the operation of the cylinder 51, comes to rest against a fixed slide to drive in rotation a platform elevating nut carrying the grippers 6, 7. Here however, this is a double assembly of the one in the first embodiment, in that, in the absence of contact with the slide, the elevating nut occupies a high position, i.e. the grippers 6, 7 are in their operating plane 25. For this reason, like the counter-slide 39, the slide of the third embodiment is turned at least partially towards the rear and controls the elevating nut during descent.

The construction details of the assembly will now be described. The elements identical to those of the first embodiment have retained their reference, while the elements which are simply similar, i.e. having the same function but a different form, have the same reference but preceded by the two hundreds digit "2". For the sake of brevity of the disclosure, only differences of construction and detailed operation with the first embodiment will be given.

Figure 10:
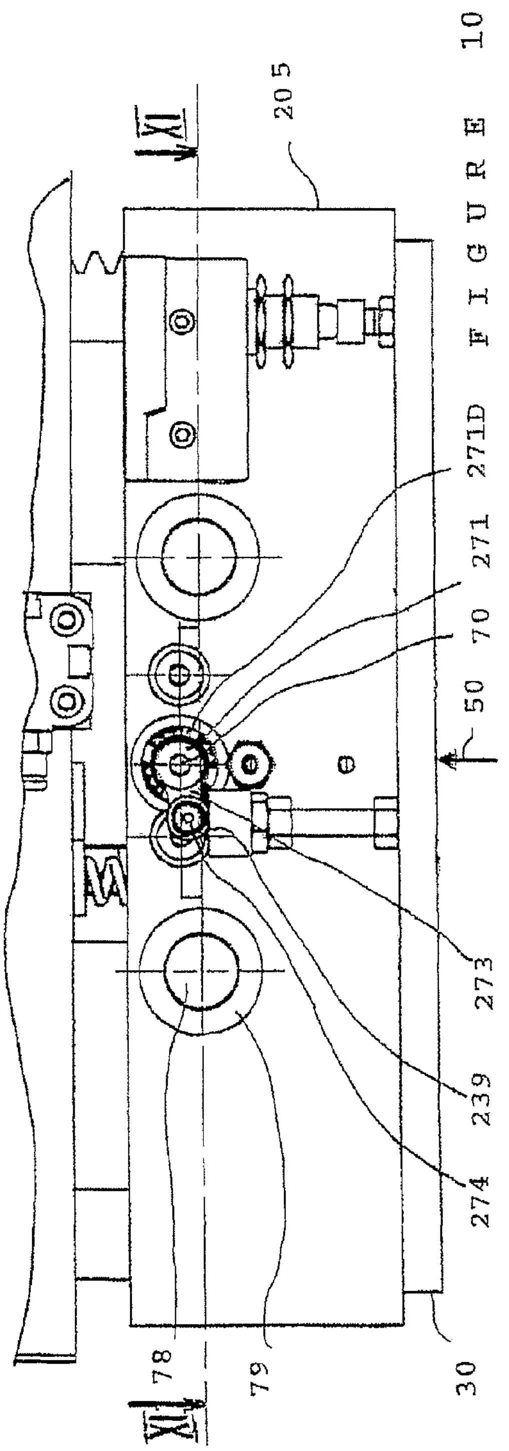
Figure 11:
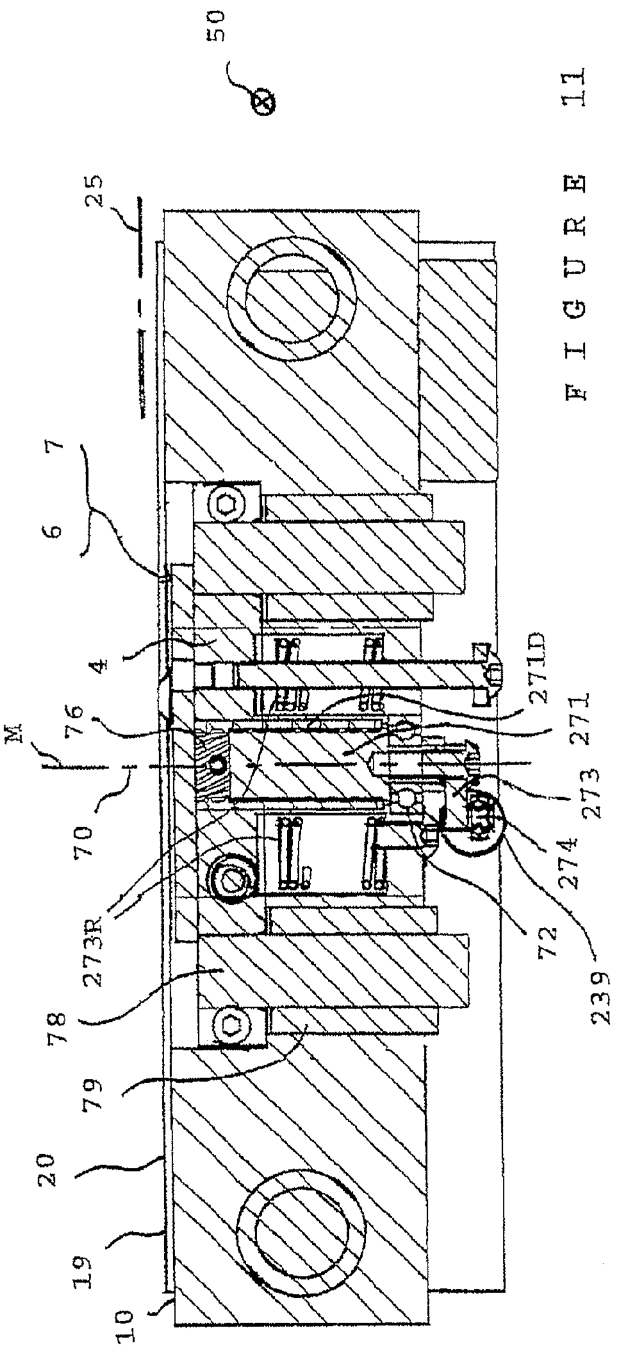

Homologous FIGS. 8 and 10, in bottom view, respectively in position for clamping the mouldings 21, 22 and in rest position, represent the elevating screw 271 firmly fixed by its lower end to a radial connecting rod 273 a free end of which 274 is provided to come to rest and slide horizontally (FIG. 10) against a fixed stop 239 carried by the support plate 30 and at least partially (here totally) turned towards the rear. As shown in an inspection of FIGS. 8 then 10, the contact with the stop 239 is established when the control bar 205 returns from its operating position (FIG. 8) towards its rest position (FIG. 10), i.e. moves on return towards the front plate 30, under the action of the cylinder 50, in this case double-action, following the direction opposite to the arrow of the direction of actuation 50. The free end 274 is in this case constituted by a stud or a screw head having an axis parallel to the shaft 70, serving to fix a toric part made of shock-absorbent material, such as a plastic material or rubber, which comes into contact with the stop 239.

FIG. 9 is a vertical cross section along the vertical shaft 70 of the screw 271, with teeth 271D, the lower end section of which is carried by the bearing 72, and the upper end section of which carries, and moves along the vertical shaft 70, the associated nut 76 and the elevating table 4 carrying the grippers 6, 7. The return of the nut 16 to the operational high position is carried out in this case by two return springs 237R, here having a helical form with axis parallel to the vertical shaft 70.

In comparison to the second embodiment, where the compression of the spring 173R of the rack unit 173 continues until the operating position of full deployment of the cylinder 51, the advantage of the assembly of the third embodiment resides in the fact that the return springs 237R exert their force perpendicularly to the horizontal direction of actuation 50 of the cylinder 51. The cylinder 51 must of course, during its return, develop the energy required to compress them by approximately 1 cm during the pivoting of the connecting rod 273, but this compression stops there and the continued return to the rest position of the cylinder 51 therefore does not require additional force to be applied to the springs 237R. Moreover, the cylinder 51 then does not need to exert a clamping force on the grippers 6, 7. And most importantly, in the clamping direction (arrow 50), the return springs 237R do not exert any opposing force. It is therefore possible to provide relatively powerful springs 237R to increase their speed of deployment, without problems.

The three embodiments described above have in common the fact of starting from a standard machine within which the invention has been integrated. In particular, it is interesting to note that the drive cylinder 51 remains unchanged, i.e. with having a rectilinear travel which is fictitiously, i.e. operationally but non not mechanically, divided into two sections, respectively upstream and downstream. The elevating kinematic linkage part, comprising the elevating screw 71, 271 or 171 controlled by the connecting rod 73, 273 or the rack unit 173 acting as a detector of sliding movement, has therefore been added, operationally in parallel with the standard kinematic linkage which drives the control bar 5, 105, 205 in a sliding fashion following the direction 50 towards the corner 13.

In other embodiments, two separate kinematic linkages can be provided, with their own drive means, mutually mounted in series, the elevating sequence being, preferably, the first to operate, from the rest position, so that the grippers 6, 7 reach the mouldings 21, 22 in a direction parallel to the table 10. In fact, a rising phase which is not stopped risks lifting them by the pressure exerted by the grippers 6, 7.

The drive means can be of any suitable type. Apart from a hydraulic or pneumatic cylinder, a rotary electric motor can for example be provided coupled to a rack which is mobile, rigid or in the form of a synchronous belt mounted in a loop on two pulleys, replacing the mobile chassis 52.

As regards the elevating device, variants can be envisaged to the elevating screw described. In particular, a ramp carrying the elevating table 4 can be envisaged, which would then simply push on the latter by drive means The helical ramp constituted by the threaded teeth 71D would thus be replaced by a straight ramp.

A lever can also be envisaged having an actuator arm which would be pushed backwards by drive means and a carrier arm which, supporting the elevating table 4, would thus pivot upwards. To this end, it can be envisaged that the axis of the lever is inclined to the vertical and that the carrier arm at rest occupies a low position, moving to a higher position when the actuator arm has retracted.

The invention claimed is:

1. Mechanism for a machine for stapling two mouldings, comprising a table, for supporting the mouldings, and a kinematic linkage for actuating two jaws in an operating plane substantially parallel with the table, for pushing the two respective mouldings back laterally towards a respective operating position, against two side stops respectively extending in mutually inclined directions, and then after stapling, moving away from the stops and returning to a rest position, wherein the kinematic linkage comprises means for elevating the jaws arranged to displace, under the action of means for driving the means for elevating the jaws, the jaws in a direction transverse to the operating plane, so that the jaws can thus be retracted, into the rest position, outside the operating plane and in which the elevating means comprise a chassis integral with the table and a control unit slidably mounted with respect to the chassis under the action of the drive means, in a predetermined direction of sliding with respect to the table, the control unit comprising a detector of the sliding movement which is provided for driving in rotation a elevating screw, carried by the control unit and oriented substantially perpendicularly to the plane of the table, the threading of which is coupled with a nut, fixed in rotation, integral with an elevating table carrying the two jaws.

2. Mechanism according to claim 1, in which the movement detector is a pivot control connecting rod extending in a direction having a radial component from the elevating screw with which it is integral, a free end of the connecting rod being arranged so as to establish a stop bearing, oblique with respect to the direction of sliding, on a pivot control slide integral with the table and extending in a determined direction of extension, so that the connecting rod thus pivot during the sliding of the control unit and thus drive the elevating screw in rotation.

3. Mechanism according to claim 2, in which the pivot control slide is at least partially turned opposite to an actuating direction of the drive means in the direction of sliding, in order to thus control the rise of the jaws from their rest position.

4. Mechanism according to claim 2, in which the pivot control slide is at least partially turned in an actuating direction of the drive means in the direction of sliding in order to, during the return of the drive means to a rest position, control the retraction of the jaws against the action of means of return towards their operating plane.

5. Mechanism according to claim 2, in which the elevating means are arranged to ensure their function in an upstream section of an inward trajectory of the jaws in the operating plane.

6. Mechanism according to claim 5, in which the elevating means are arranged to give to the jaws, in a downstream section of an inward trajectory of the jaws in the operating plane, a movement of coming alongside the mouldings according to a predetermined angle of descent.

7. Mechanism according to claim 5, in which, the drive means are arranged to cover an upstream section of travel, for displacing the elevating means along the upstream section of trajectory bringing the jaws into the operating plane, and arranged to then continue their movement along a downstream section of travel to displace the kinematic linkage along a downstream section of trajectory bringing the jaws in their entirety towards a corner of convergence of the side stops and in a direction of sliding substantially parallel to the table.

8. Mechanism according to claim 7, in which the pivot control slide occupies a range of limited length according to its direction of extension, so that when the elevating means have travelled the upstream section of trajectory, the connecting rod then occupies an extreme angular position for which its free end is at the end of said range, the pivot control slide being followed by another angular support slide, in a direction of extension substantially parallel to the direction of sliding of the control unit, in order thus, during the travel of the downstream section of trajectory by the elevating means, to keep the connecting rod in the extreme angular position and therefore also to keep the jaws in the operating plane.

9. Mechanism according to claim 1, in which the movement detector is a rack unit extending substantially in the direction of sliding mounted so as to be unaffected by said sliding movement, on at least one section of travel of the latter, and carrying a rack for driving a lifting pinion mounted on the control unit and controlling the rotation of the elevating screw.

10. Mechanism according to claim 9, in which the elevating means are arranged to ensure their function in an upstream section of an inward trajectory of the jaws in the operating plane.

11. Mechanism according to claim 10, in which, the drive means are arranged to cover an upstream section of travel, for displacing the elevating means along the upstream section of trajectory bringing the jaws into the operating plane, and arranged to then continue their movement along a downstream section of travel to displace the kinematic linkage along a downstream section of trajectory bringing the jaws in their entirety towards a corner of convergence of the side stops and in a direction of sliding substantially parallel to the table.

12. Mechanism according claim 11, in which the rack unit is slidably mounted on the control unit according to the direction of sliding and is coupled to a first end of a spring for returning to the rest position, a second end of which is fixed with respect to the table, for opposing a sliding drive movement of the rack unit under the sliding action of the control unit, and the control unit comprises a pushing stop substantially turned towards the direction of sliding, and in the direction corresponding to leaving the rest position, in order to come to abut against a driving stop surface for the rack unit and thus driving it slidably with the control unit, the return spring being calibrated to at least a minimum force threshold, so that it ensures its return its function while the pushing stop has not yet reached the drive surface.

13. Mechanism according to claim 1, in which the elevating means are arranged to ensure their function in an upstream section of an inward trajectory of the jaws in the operating plane.

14. Mechanism according to claim 1, in which the elevating means are arranged to give to the jaws, in a downstream section of an inward trajectory of the jaws in the operating plane, a movement of coming alongside the mouldings according to a predetermined angle of descent.

* * * * *